United States Patent [19]

Dholakia

[11] Patent Number: 4,502,135
[45] Date of Patent: Feb. 26, 1985

[54] PICKUP CARTRIDGE HAVING IMPROVED STYLUS FLYLEAD

[75] Inventor: Anil R. Dholakia, East Windsor, N.J.

[73] Assignee: RCA Corporation, New York, N.Y.

[21] Appl. No.: 543,718

[22] Filed: Oct. 20, 1983

[51] Int. Cl.³ .............................................. G11B 3/50
[52] U.S. Cl. .................... 369/170; 267/137; 369/126; 369/139
[58] Field of Search ............. 369/170, 171, 172, 173, 369/126, 139, 151; 267/137, 140.4, 158, 151, 152

[56] References Cited

U.S. PATENT DOCUMENTS

| 2,326,424 | 8/1943 | Andres | 369/170 |
| 2,498,210 | 2/1950 | Kilgour | 369/170 |
| 2,509,356 | 5/1950 | Kilgour | 369/170 |
| 4,077,050 | 2/1978 | Dholakia | 369/126 |
| 4,278,726 | 7/1941 | Wieme | 267/140.4 |
| 4,441,176 | 4/1984 | Newell | 369/170 |

Primary Examiner—Steven L. Stephan
Attorney, Agent, or Firm—Paul J. Rasmussen; William H. Meise; Dilip A. Kulkarni

[57] ABSTRACT

A pickup cartridge comprises a stylus arm having a stylus disposed at one end, and having the other end thereof flexibly supported in the cartridge. A flylead connects an electrode arranged on the stylus to a terminal mounted on the cartridge. In accordance with the instant invention, the stylus flylead is covered with a damping compound to improve the reliability of high speed scanning of the disc.

7 Claims, 4 Drawing Figures

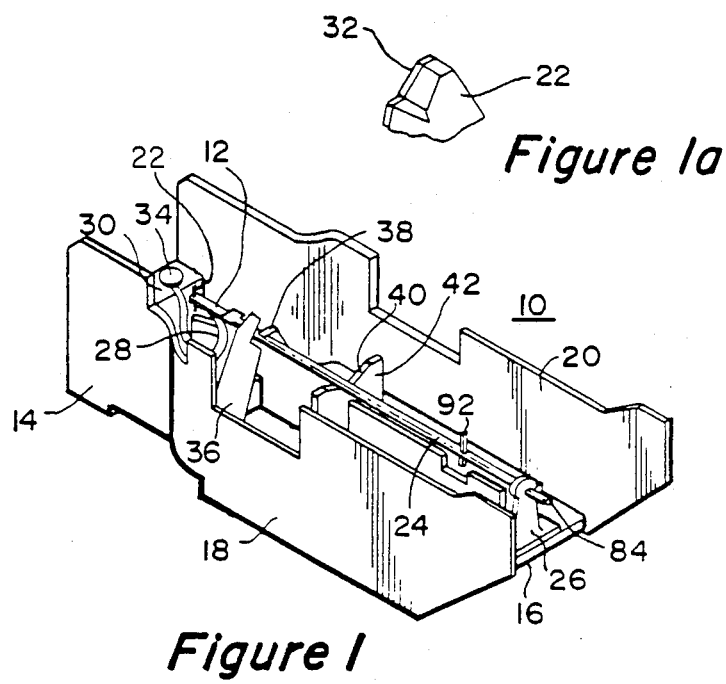
Figure 1a
Figure 1
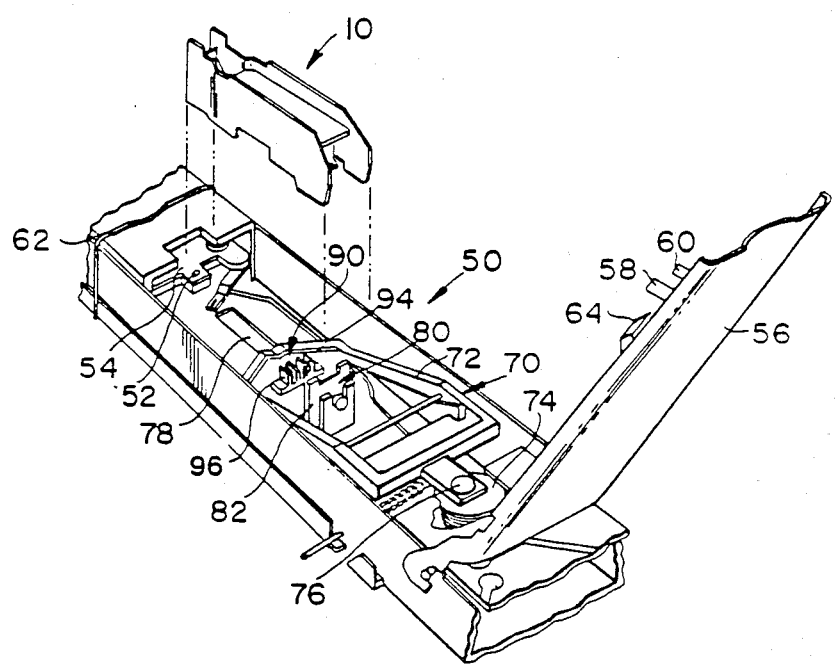
Figure 2

PICKUP CARTRIDGE HAVING IMPROVED STYLUS FLYLEAD

The present invention relates generally to a video disc record player and, more particularly, to a pickup stylus cartridge for use therewith.

In a capacitance-type video disc system, audio and video information is recorded as geometric variations in a spiral information track on a disc record having a conductive property. A variable capacitance is formed between a stylus-mounted electrode and the conductive property of the disc record. As the record is rotated, the signal recovered at the stylus electrode is related to the varying capacitance, which, in turn, is directly related to the signal recorded in the information track. The recovered signal is then processed for application to a television receiver for playback of the recorded video and audio information. One example of this type of video disc system is described in U.S. Pat. No. 3,842,194 granted to J. K. Clemens.

In video disc systems, the information track density is generally quite high. For example, the abovementioned capacitance-type system uses a spirally-grooved information track with a groove density of nearly 10,000 grooves per inch (groove width=approximately 2.5 micrometers). During playback, the stylus tip is received in the groove and guided toward the record center as a turntable-supported record revolves at the desired speed (i.e., 7.5 revolutions per second). The microscopic groove geometries require a stylus that has rather fine dimensions (e.g., tip width—2 micrometers).

The pickup stylus is typically housed in a protective cartridge. The stylus is disposed at one end of a stylus holder attached to the free end of a stylus arm. The other end of the stylus arm is suspended in a cartridge housing by a rubber suspension. The stylus arm is held inside the cartridge housing in its stored position by a pair of retaining fingers. A flylead has one end secured to the stylus, and its other end to the cartridge housing. The flylead provides the stylus/record engagement force, and also serves as the electrical connection between the stylus and the signal processing circuits of a video disc player.

The stylus cartridge is inserted into a carriage translatably mounted in the video disc player. When the cartridge is thus installed in the carriage, the stylus arm retaining fingers are automatically spread apart to release the stylus arm. The stylus arm rests on a stylus arm support bracket when freed from the cartridge retaining fingers as will become clear later. The bottom wall of the carriage has an opening through which the stylus is selectively lowered onto a turntable-supported record for playback. The carriage is driven to cause it to follow the radially inward motion of the groove-guided stylus.

Disposed in the carriage are a number of stylus arm control mechanisms. The stylus arm lifting/lowering mechanism serves to lower the stylus onto the disc for playback, and then raise it back up into the cartridge for storage. (Refer to U.S. patent application, Ser. No. 449,314, of Brauer.) A groove skipper mechanism, housed in the carriage, comprises a permanent magnet mounted on the stylus arm at right angles to it, and an electromagnet located in the carriage near the skipper magnet. The groove skipper mechanism, when activated, serves to displace the stylus laterally of the record, for example, in order to cause the stylus to skip ahead or back. (See U.S. Pat. No. 4,258,233 issued to Simshauser.) Further mounted in the carriage is an armstretcher mechanism including a further permanent magent disposed axially inside the stylus arm tube, and an electromagnet located in the carriage adjacent to it. When signals are applied to the armstretcher electromagnet, it produces magnetic fields which interact with the stylus arm-mounted, axial magnet to cause front-to-back motion of the stylus arm in a manner opposing the cyclical errors in the stylus/record relative velocity during playback. (Refer to U.S. patent application, Ser. No. 366,644, of Taylor et al.)

For some applications (e.g., random access, interactive disc system, etc.), it is advantageous to cause the stylus to skip from one point on the disc to another point on the disc in the shortest possible time. To this end, the groove skipper mechanism is repeatedly activated to kick the stylus sideways in the desired direction (i.e., forward or backward). To improve the speed of travel of the stylus across the disc, it is possible to increase the rate at which the stylus is kicked (i.e., number of stylus kicks per revolution of the disc) and/or to increase the length of each stylus displacement (i.e., number of grooves per stylus kick). For instance, the stylus can be made to scan the disc at 16 times the playback speed by causing the stylus to skip two grooves each time it is kicked, and kicking it eight times every revolution of the disc. To further increase the disc scanning speed to eighty times the playback speed, the stylus can be kicked forty times a disc revolution, while holding the number of grooves per stylus kick the same (i.e., 2 grooves per kick).

For such applications, the consistency of stylus skips (i.e., the number of grooves per stylus kick) at different stylus kick rates (i.e., the number of stylus kicks per disc revolution) is critical. It has been, however, observed that as the stylus kick rates are increased, the consistency of stylus skips deteriorates.

To this end, in accordance with the present invention, the stylus flylead is covered with damping compound (e.g., Viscoloid, polystyrene, etc.). It is felt that the erratic skip performance is attributable to mechanical resonances of the stylus arm assembly. The stylus arm assembly with a damped flylead exhibits a more uniform frequency response (i.e., less pronounced resonant modes), whereby the repeatability of the stylus skips is improved.

In the drawings:

FIG. 1 is a pickup cartridge, shown upside down, incorporating a damped stylus flylead in accordance with this invention;

FIG. 2 shows a translatable carriage into which the pickup cartridge of FIG. 1 is inserted;

Figure 3:
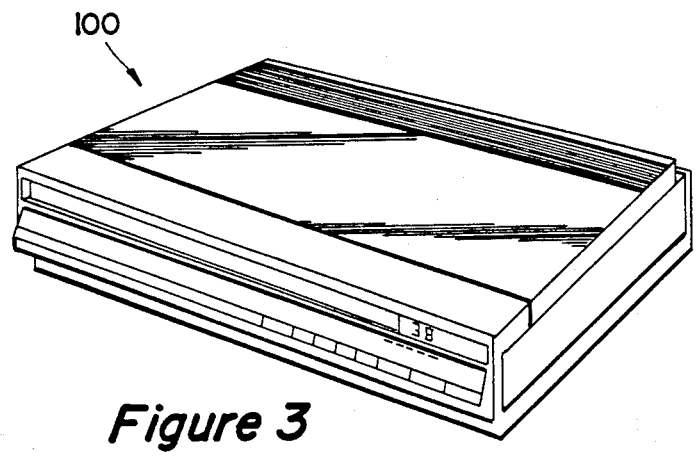
FIG. 3 illustrates a video disc player into which the FIG. 2 carriage is translatably mounted.

Shown in FIG. 1 is a pickup cartridge 10 embodying a stylus flylead 28 coated with damping compound according to the present invention. The cartridge has a molded plastic housing 14 (e.g., polystyrene) comprising a top wall 16 interconnecting a pair of spaced side walls 18 and 20. A pickup stylus 22 is disposed at one end of a stylus holder 12 at an angle (e.g., 67.5°) such that when the stylus is lowered onto a turntable-mounted disc for playback the stylus bears an appropriate orientation toward the disc surface (e.g., 85°). The pickup stylus 22 consists of a diamond tip disposed at the end of a titanium shank. The stylus tip dimensions are: height—3 micrometers, width—2 micrometers, and depth—5 micrometers. The titanium stylus shank is about 0.070 inches long, and 0.012 inches in diameter. To secure the stylus 22 to the stylus holder 12, the stylus is simply pierced into the plastic holder at the desired angle.

The stylus holder 12 is rigidly secured to a tubular, light-weight stylus arm 24 by inserting the other end of the holder into the hollow stylus arm, and then crimping the end of the stylus arm over the holder. The stylus arm 24 comprises a relatively stiff aluminum tube about 1.654 inches long, having an inside diameter of 0.040 inches and a wall thickness of 0.002 inches. The back end of the stylus arm 24 is suspended from the top wall 16 by a rubber suspension 26. The rear suspension 26 of the stylus arm 24 comprises a flat piece of rubber about 0.375 inches long, 0.125 inches wide and 0.015 inches thick.

A planar, ribbon-like flylead 28, deformed into a compressive arc, is connected between the stylus 22, and a shelf portion 30, integrally molded with the cartridge casing 14. The flylead 28 provides an electrical connection between a stylus-mounted electrode 32, approximately 0.2 micrometers deep, and the player pickup circuits housed in the carriage 50, shown in FIG. 2, when the cartridge is installed in the carriage. The flylead 28 additionally serves to provide stylus/record engagement force during play. The flylead 28 comprises a flat leaf spring made from copper, about 1.125 inches long, 0.025 inches wide and 0.000560 inches thick. One end of the leaf spring 28 is glued to the stylus 22 by a suitable epoxy. The other end of the flylead 28 is attached to the cartridge shelf 30 by a metallic rivet 34. The length of the flylead 28 is such that it tends to expel the stylus 22 from the cartridge 10 when the stylus arm is in the stored position, and such that it provides appropriate stylus/record tracking pressure (e.g., 60 to 70 milligrams) when the stylus is lowered onto the disc for playback.

As previously indicated, the subject stylus flylead 28 is covered with a coating of rubber or plastic material with optimum viscosity to dampen the vibrations of the flylead excited by periodically repeated stylus kicking, whereby the stylus skip performance is improved. Examples of suitable damping compounds are Viscoloid, polystyrene, Kapton, Parylene, etc. Illustrative thickness of the coating of the damping compound on the stylus flylead 28 ranges from 0.001 to 0.010 inches. Any suitable technique could be used to coat the flylead— such as sputtering, vapor disposition, spray coating (with Freon as the carrier), etc.

The cartridge 10 is fitted with a pair of flat retaining fingers 36 and 38 to hold the stylus arm 24 against a V-shaped groove 40 disposed in a downwardly depending wall 42 integrally molded with the cartridge case 14.

The cartridge 10 is installed in a carriage 50 shown in FIG. 2. Upon installation, the cartridge terminal 34 contacts a terminal 52 of pickup circuits 54. When the carriage lid 56 is closed, a pair of depending tabs 58 and 60 disposed thereon defeat the cartridge retaining fingers 36 and 38 to release the stylus arm 24. The carriage 50 is fitted with a wire hoop 62 to lock the lid 56 shut. A leaf spring 64, attached to the underside of the lid 56, firmly seats the cartridge 10 in the carriage 50 upon closure.

Housed in the carriage 50 is a stylus lifter mechanism 70 comprising a pivotally-mounted, stylus arm support bracket 72, and an electromagnet 74. The stylus arm 24 rests on the lifter support bracket 72 as the cartridge retaining fingers 36 and 38 are spread apart upon insertion of the cartridge 10 in the carriage 50. When the lifter electromagnet 74 is actuated, a permanent magnet 76 attached to the lifter bracket 72 is repelled to cause the bracket to gently lower the stylus 22 through an opening 78 in the carriage 50 onto a turntable-mounted record. The abovesaid U.S. patent application of Brauer describes a suitable stylus lifter mechanism of this type.

An armstretcher mechanism 80, which is located in the carriage 50, comprises an electromagnet 82 and an axial magnet 84 mounted inside the stylus arm tube 24. The armstretcher electromagnet 82 creates forces on the axial magnet 84 to cause to-and-fro excursions of the stylus 22 in a manner offsetting cyclical errors in the stylus/record relative velocity during playback. A more detailed description of the armstretcher mechanism can be found in the aforesaid U.S. patent application of Taylor et al.

Further mounted in the carriage 50 is a stylus skipper mechanism 90 including a stylus arm-mounted, perpendicular magnet 92, and a pair of Helmholtz air coils 94 and 96. When energized, the air coils 94 and 96 kick the stylus 22 sideways across the record, for example, for rapid visual search. U.S. Pat. No. 4,258,233 gives specifics of the stylus skipper mechanism.

Figure 4:
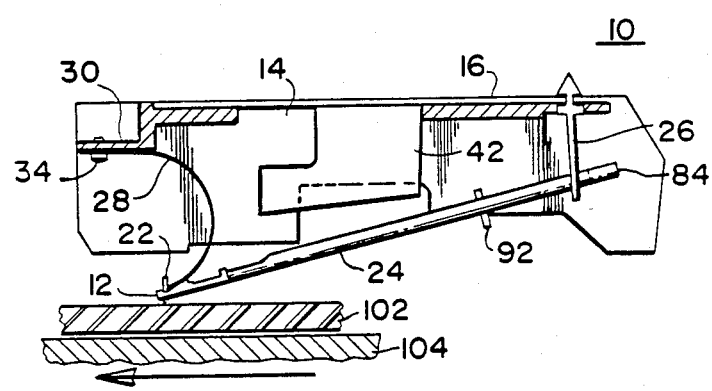
FIG. 4 depicts a cross-sectional view of the FIG. 1 pickup cartridge illustrated in an operating relationship with a video disc.

The pickup carriage 50 is translatably mounted in the video disc player 100 shown in FIG. 3. To initiate playback, the stylus lifter 70 is actuated to lower the stylus 22 onto a video disc 102 disposed on a rotatable turntable 104 in the manner depicted in FIG. 4. During playback, the turntable 104 is rotated at the desired speed (e.g., 7.5 rps) and the carriage 50 is translated toward the record center to recover the prerecorded signals from the disc 102.

As indicated previously, it is desirable to go from one point on the disc to another in the fastest possible way for certain applications, such as interactive video disc system. A series of electrical pulses are, a seriatim, applied to the groove kicker mechanism. The number of grooves skipped by the stylus each time the groove kicker mechanism is operated (i.e., kick size) depends upon the duration of the applied pulses. The rate at which the stylus is kicked is a function of the pulse rate. For reliable high speed scanning of the disc, it is crucial to have a high degree of consistency in the operation of the groove skipper mechanism.

There are several techniques for evaluating the stylus skipping response. One way is to measure the number of grooves skipped by the stylus as the length of the pulse is increased (while holding the pulse rate constant). Another way is to measure the number of grooves skipped by the stylus as the pulse repetition rate is increased (while holding the pulse width constant). It has been found that the damped stylus flylead of this invention improves the stylus kicking performance. It is believed that the damping of the stylus flylead makes the resonant modes of the stylus flylead less conspicuous, thereby improving the stylus kicking response.

What is claimed is:

1. A protective cartridge for housing a pickup stylus including an electrode adapted for recovering prerecorded information from a disc record; said protective cartridge comprising:

(A) a compliant stylus holder for supporting said pickup stylus;

(B) a stylus arm having said compliant stylus holder disposed at one end thereof, and having its other end yieldably supported in said cartridge;

(C) a stylus flylead, separate from said stylus holder, for electrically connecting said stylus electrode to a terminal disposed on said cartridge; and (D) means for damping said stylus flylead consisting of a coating of damping material disposed on said flylead.

2. The cartridge as defined in claim 1 wherein said damping material comprises a coating of Viscoloid-like material.

3. The cartridge as set forth in claim 1 wherein said damping material comprises a coating of plastic material.

4. The cartridge as described in claim 3 wherein said damping material comprises a coating of polystyrene.

5. The cartridge as outlined in claim 1 wherein said damping material comprises a coating of rubber material.

6. The cartridge of claim 1 wherein said stylus flylead additionally serves to provide tracking force between said stylus and said disc during playback.

7. The claim 6 cartridge further including means for retaining said stylus arm within said cartridge during storage and handling.

* * * * *